Figure 1:
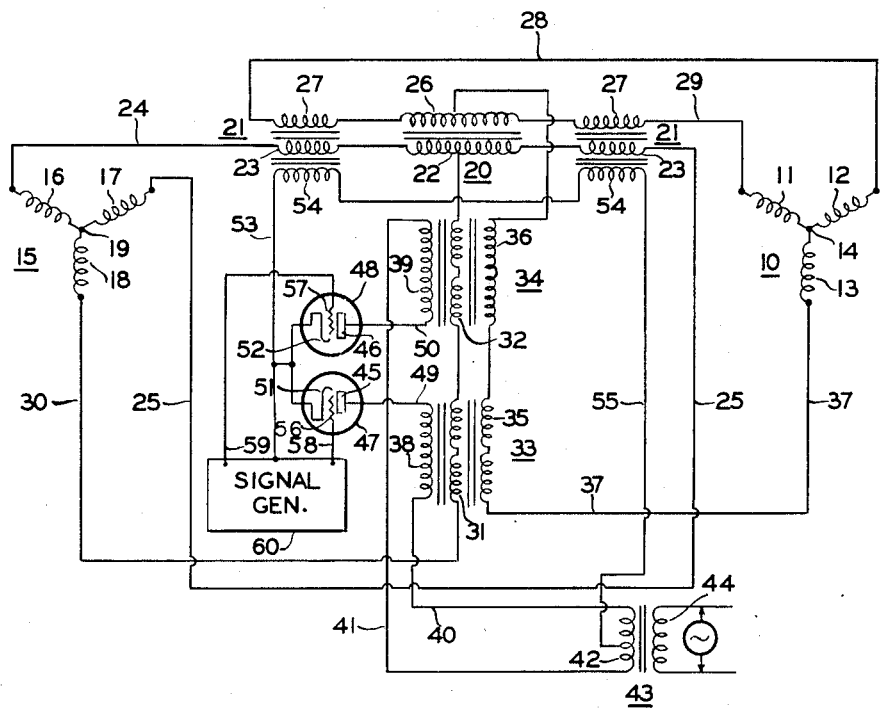

Aug. 26, 1952 A. M. MacCALLUM ET AL 2,608,676
INDUCTION MOTOR CONTROL SYSTEM
Filed Jan. 10, 1946 2 SHEETS—SHEET 1

INVENTORS
A. M. MACCALLUM
W. HARGREAVES
BY
ATTORNEY

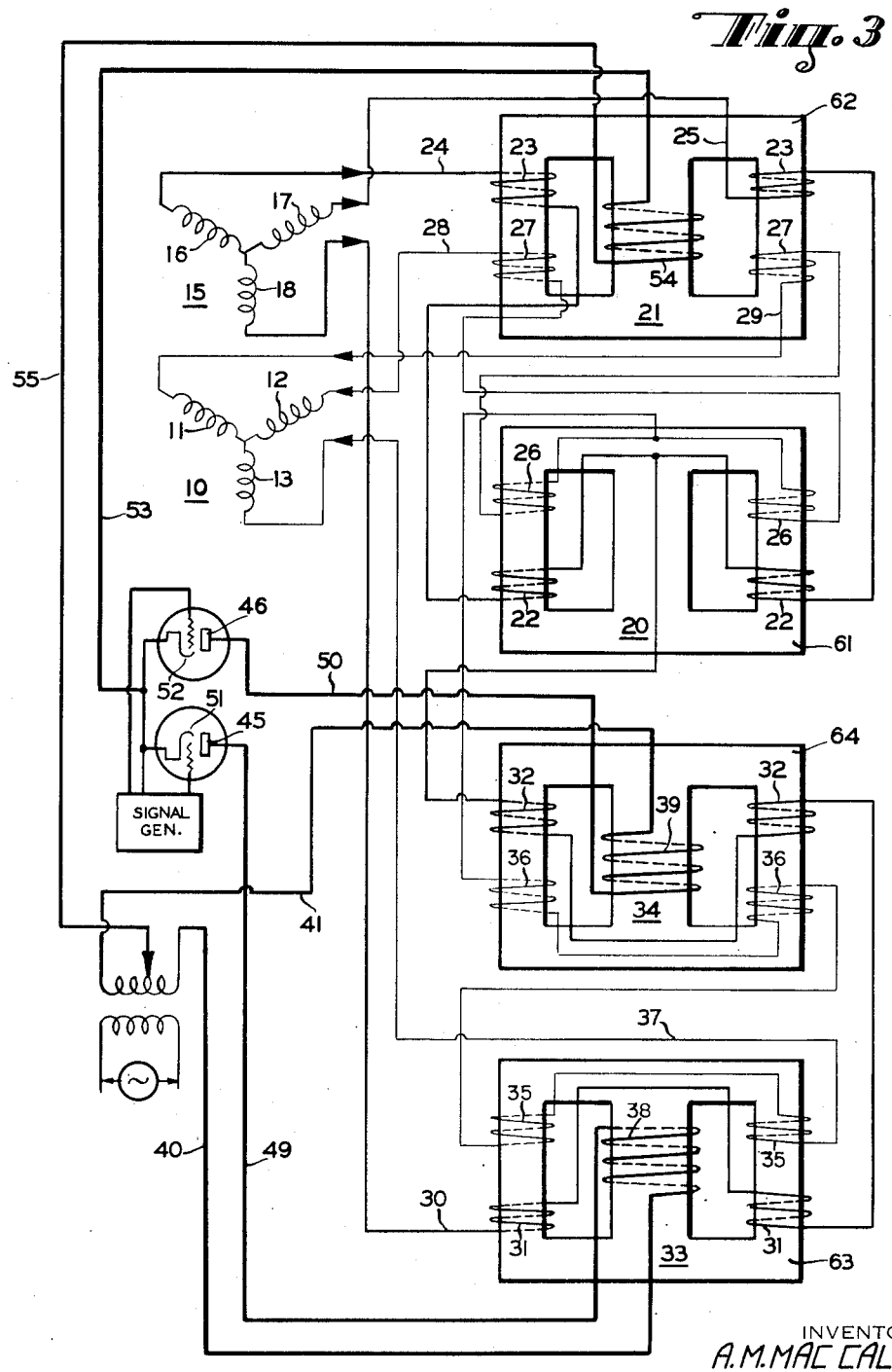

Patented Aug. 26, 1952

2,608,676

UNITED STATES PATENT OFFICE 2,608,676

INDUCTION MOTOR CONTROL SYSTEM

Alan M. MacCallum, Maywood, and William Hargreaves, Bergenfield, N. J., assignors to Bendix Aviation Corporation, Teterboro, N. J., a corporation of Delaware Application January 10, 1946, Serial No. 640,283

11 Claims. (Cl. 318—207)

The present invention relates to control systems generally and more particularly to electrical systems for automatically controlling the direction of rotation of a polyphase motor without the use of contacts, switches or other mechanically movable parts.

Systems heretofore proposed for automatically reversing the rotation of a three phase motor are represented by U. S. Patent No. 1,844,704 issued February 9, 1932, to L. W. Thompson and utilize saturable reactors arranged between two of the motor terminals and two of the power supply conductors leaving the third motor terminal continually energized from the source. To effect the desired control, the saturable reactors act to reverse the connections to two of the motor terminals so that the phase rotation is reversed. As is known, the characteristics of reactors are such that they never provide a zero impedance in the circuit and, moreover, shift the phase of current flow therethrough as they are saturated. As a result of these characteristics, the undesirable effect is obtained that the motor cannot operate at source voltage but must always operate at lower than source voltage thereby necessitating higher motor currents for equivalent power input. The resulting disadvantage is that the efficiency of the entire system is lowered so that it does not apply itself well in environments requiring highly precise control.

An object of the present invention, therefore, is to provide a novel control system for a polyphase motor whereby the foregoing disadvantages have been overcome.

Another object of the invention is to provide a novel electrical control system for a polyphase motor with the use of which a highly efficient and reliable motor control is obtained adapting it for use in applications requiring precise control.

A further object is to provide a novel electrical control system for polyphase motors wherein the use of saturable reactors and their disadvantages, such as loss of power, are eliminated and in their stead transformers are provided in a novel manner so that the controlled motor may operate at even higher than source voltage so that the best motor efficiency is acquired thereby.

Another object of the invention is to provide a novel electrical system for controlling the direction of rotation of a polyphase motor wherein all of the motor terminals are connected with the source through transformers so that in a balanced condition no voltage appears at any of the motor terminals.

A still further object is to provide a novel electrical control system for a polyphase motor whereby the direction of rotation is automatically changed without the requirement for contacts, switches or other mechanical expedients thereby adapting the motor for use in accurately and readily operating the control surfaces of marine or aircraft automatic pilots, stabilization of radar antennae, etc.

The above and further objects and novel features of the invention will appear more fully from the following detailed description when the same is read in connection with the accompanying drawings. It is to be expressly understood, however, that the drawings are for purposes of illustration only and are not intended as a definition of the limits of the invention.

Figure 2:
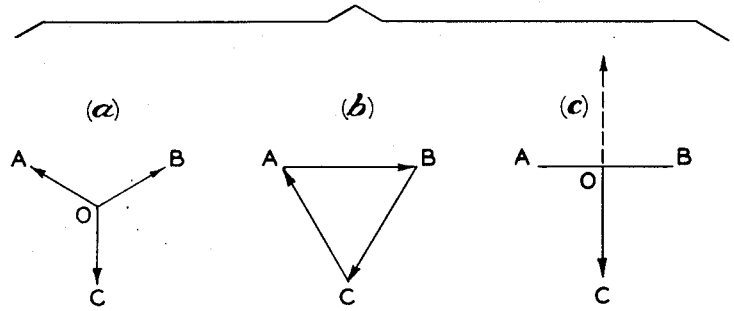

In the drawings wherein like reference characters refer to like parts throughout the several views, Figure 1 is a schematic illustration of the novel electrical control system for a polyphase motor constituting the subject matter of the present invention, Figure 2 constitutes vector diagrams $a$, $b$ and $c$ representing the phases of voltages in the arrangement of Figure 1; and, Figure 3 is a pictorial showing of the novel transformer means for interconnecting the motor and the power source of Figure 1.

The motor whose direction of rotation is to be controlled, is shown in the present instance in Figure 1 as a three phase motor 10 having windings 11, 12 and 13 with the inner end of each winding connected to midpoint 14, although it is to be understood that the novel automatic reversing control to be hereinafter described in detail is applicable as well to any polyphase motor. The power source for motor 10 may be an alternator 15 having windings 16, 17 and 18 interconnected at their inner ends to midpoint 19.

The principle underlying the present invention may be best understood by reference to vector diagrams $a$, $b$ and $c$ of Figure 2. The voltages generated across windings 16, 17 and 18 of alternator 15 may be represented by vector diagram $a$ wherein the three voltages, A, B and C are shown spaced apart 120 electrical degrees. Vector diagram $b$ represents a resolution of the three voltages of diagram $a$ whereby vectors AB, BC and CA are obtained. As is known to those skilled in the art, by the use of a Scott transformer arrangement, a three phase arrangement may be changed into one of two phases and by the use of such transformers vectors AB and OC are obtained as shown in diagram $c$. When the phase of the voltage across motor winding 13 is shifted 180° (equivalent to rotating vector OC of diagram c 180° to the dotted line position) the phase rotation of the voltages is reversed, thereby reversing rotation of the motor.

The novel arrangement for carrying out the above discussed principle comprises a pair of transformers 20 and 21, the latter being shown in two parts in Figure 1 for purposes of clarity. The primaries 22 and 23 of these transformers are connected in series and interconnect the outer terminals of alternator windings 16 and 17 with each other by way of conductors 24 and 25. The secondaries 26 and 27 of these transformers, on the other hand, are connected in series and interconnect the outer terminals of motor windings 11 and 12 by way of conductors 28 and 29, it being noted that secondary 27 is wound in series opposed relation with respect to secondary 26 so that under normal or balanced conditions, even though voltages appear at the outer terminals of alternator windings 16 and 17, the voltage across secondary 26 is equal, and opposite in phase to the voltage across secondary 27 and no voltage will appear at the outer ends of motor windings 11 and 12.

The outer terminal of alternator winding 18 is connected by way of a conductor 30 with the midpoint of primary 22 of transformer 20 through series connected split primary windings 31 and 32 of transformers 33 and 34. The secondaries of the latter transformers comprise series connected split windings 35 and 36, winding 36 being connected to the midpoint of secondary 26 of transformer 20 and winding 35 being connected directly by way of a conductor 37 with the outer terminal end of motor winding 13. As in the case of secondaries 26 and 27 of transformers 20 and 21, secondary windings 35 and 36 are wound in series opposed relation so that, under normally balanced conditions, the voltage across secondary winding 35 is equal, and opposite in phase to the voltage across secondary winding 36 and no voltage appears at motor winding 13.

Transformers 20 and 21 and transformers 33 and 34 constitute a conventional Scott transformer arrangement and the net result of the arrangement is that by connecting alternator leg 18 through primaries 31 and 32 with the midpoint of the primary of transformer 20, an electrical midpoint for the alternator is, in effect, established so that only the voltage appearing in alternator winding 18 need be considered. This electrical midpoint is indicated at 0 of diagram c of Figure 2. Since vector OC of the latter diagram has a voltage of a value less than that across vector AB, the latter being a resolution of the voltages in alternator windings 16 and 17 while the former represents the voltage of only winding 18, secondary windings 35 and 36 of transformers 33 and 34 are connected to the midpoint of secondary winding 26 of transformer 20 so that secondaries 35 and 36 pick up in addition half of the voltage across secondary 26 of transformer 20.

In order to reverse the phase of the voltage across motor winding 13 which, in effect, amounts to displacing vector OC of diagram c of Figure 2, 180°, i. e., to the dotted line position there shown, saturating windings 38 and 39 are provided on transformers 33 and 34, the outer ends of which connect by way of conductors 40 and 41 with the secondary 42 of a transformer 43 whose primary 44 connects with a suitable source of current supply. The inner ends of windings 38 and 39 connect with plates 45 and 46 of vacuum tubes 47 and 48 by way of conductors 49 and 50. Cathodes 51 and 52 of tubes 47 and 48 are interconnected by way of a lead 53 with a saturating winding 54 arranged on transformer 21, the free end of the latter winding being tapped to the midpoint of transformer 43 by way of conductor 55. Grids 56 and 57 of tubes 47 and 48 are connected by way of leads 58 and 59 with a signal generator designated generally with the reference character 60 and which may comprise an arrangement such as that shown and more fully described in copending application Serial No. 516,488 filed December 31, 1943.

Depending upon the polarity of the signal originating in generator 60, either one or the other of the tubes 47 or 48 becomes conductive so that current flows either at plate 45 or 46 communicating direct current to either saturating winding 38 or 39 whereby the related transformer becomes a poor transformer and an unbalance is developed so that a voltage is impressed across motor winding 13, the phase of the voltage across the latter winding depending upon which of saturating windings 38 or 39 is provided with direct current. Whenever current flows in saturating windings 38 or 39, direct current also flows in saturating winding 54 through either of cathodes 51 or 52 thereby making transformer 21 a poor one and thereby unbalancing the secondary circuit so that a net voltage appears across secondaries 26 and 27 of transformer 20 thereby energizing both motor windings 11 and 12.

With the foregoing arrangement, therefore, as soon as control signal appears at generator 60 motor windings 11 and 12 are energized because of the unbalance of secondaries 26 and 27 of transformers 20 and 21 resulting from current flow in saturating winding 54, and a voltage also is impressed across motor winding 13 because of the unbalance of secondaries 35 and 36 of transformers 33 and 34, the phase of the voltage across winding 13 depending upon which saturating winding is provided with direct current. Phase reversal of the voltage across the latter motor winding determines the direction of rotation of motor 10.

The various transformers and their primaries, secondaries, and saturating windings have been shown schematically in Figure 1, however, Figure 3 more nearly illustrates the actual construction and electrical hook-up of the transformers. For example, transformers 20, 21, 33 and 34, are shown provided with laminated cores 61, 62, 63 and 64. One half of the primary winding 23 is wound on core 62 of transformer 21 and connects in series with primary 22 wound on core 61 of transformer 20, the free end of the latter winding connecting with the second half of primary 23 wound on core 62 of transformer 21. One half of secondary winding 27 is wound on core 62 of transformer 21 and connects in series opposition with secondary winding 26 wound on core 61 of transformer 20, the second half of winding 27 being wound on core 62 and arranged in series opposed relation to secondary winding 26. Saturating winding 54 is arranged on core 62 of transformer 21.

Primary winding 32 is wound on core 64 of transformer 34 and is connected in series with primary winding 31 wound on core 63 of transformer 33. Secondary winding 36 is wound on core 64 of transformer 34 and is connected in series opposed relation with secondary winding 35 wound on core 63 of transformer 33. The remainder of the circuit is the same as that described in connection with Figure 1.

A novel electrical control system has thus been provided for automatically controlling the direction of rotation of a polyphase motor wherein the motor may operate accurately and efficiently at the voltage of the source or at a voltage higher than that available at the source by the use of energy transformation expedients between the motor and the source.

Although but a single embodiment of the present invention has been illustrated and described in detail, it is to be expressly understood that the invention is not limited thereto. Various changes can be made in the design and arrangement of parts without departing from the spirit and scope of the invention as will now be understood by those skilled in the art. For example, the secondaries of the saturable transformers have been described as series opposed connected but the system would operate substantially as well if instead the secondary windings were connected in series and the primary windings were connected in series opposed relation. For a definition of the limits of the invention reference will be had primarily to the appended claims.

We claim:

1. In a control system responsive to control signals and for reversing the direction of rotation of a polyphase motor actuated by a polyphase source of power, transformer means directly interconnecting said motor and said source and having a pair of series opposed windings and saturating means associated therewith for reducing the effectiveness of said windings, a device to actuate said saturating means in response to predetermined signals, the net voltage across said transformer means being approximately zero when said saturating means are inoperable, and a substantial net voltage appearing across said transformer means for energizing the motor directly therefrom when said saturating means is operable, the phase of the voltage being determined by the predetermined signal.

2. In a control system responsive to control signals and for reversing the direction of rotation of a polyphase motor actuated by a polyphase source of power, first transformer means for connecting said motor and said source and having series opposed windings arranged to de-energize the motor when the transformer means is balanced and to energize the motor when the transformer means is unbalanced, a saturating winding associated with one of said series opposed windings for unbalancing said transformer, second transformer means for interconnecting said motor and said source and having series opposed windings arranged to de-energize the motor when the second transformer means is balanced and to energize the motor when the second transformer means is unbalanced, and a saturating winding associated with each of said series opposed windings of said second transformer means, a device responsive to control signals for energizing said saturating winding of said first transformer means and for selectively energizing one or the other of said saturating windings of said second transformer means to unbalance both of said transformer means and energize said motor.

3. In a control system responsive to control signals and for reversing the direction of rotation of a polyphase motor actuated by a polyphase source of power, first and second transformers connecting the motor and the source and each having a pair of series opposed windings, one transformer being connected in series with one phase of the motor and the other transformer being connected in series with another phase of the motor, saturable core means associated with one of the series opposed windings of said first transformer and with both of the series opposed windings of said second transformer, there being means responsive to control signals to energize said saturable core means of said first transformer and to selectively energize one or the other of the saturable core means of said second transformer to reduce the effectiveness of the associated windings, the net voltage across pairs of series opposed windings being approximately zero when said saturable core means are de-energized and a net voltage of predetermined phase appearing across the series opposed windings of said first transformer when the associated saturable core means is energized, and a net voltage appearing across the series opposed windings of said second transformer when one or the other of said saturable core means is energized, the phase of the voltage being determined by the saturable core means energized.

4. In a control system responsive to control signals and for reversing the direction of rotation of a polyphase motor actuated by a three-phase source of power, a pair of transformers including series primary windings interconnecting two of the source phases and series opposed secondary windings interconnecting two of the motor phases, a control winding for one of said transformers, a second pair of transformers including series primary windings interconnecting the remaining source phase and a midpoint of the primary winding of one of said first pair of transformers and series opposed secondary windings interconnecting the remaining motor phase and a midpoint of the secondary winding of said last-named transformer, control windings for said second pair of transformers, the net voltage across each of said pairs of transformers being approximately zero when said control windings are de-energized, and control means responsive to control signals for energizing said first-named control winding and for selectively energizing one or the other of said last-named control windings to provide a substantial voltage at the secondary windings of both said first and second pairs of transformers to energize said motor.

5. In a control system responsive to control signals and for reversing the direction of rotation of a three-phase motor actuated by a three-phase source of power, a pair of transformers including series primary windings interconnecting two of said source phases and series opposed secondary windings interconnecting two of said motor phases, the windings of one of said transformers being substantially equally divided and the windings of the other transformer being connected between the halves of the associated windings, a control winding for one of said transformers, a second pair of transformers including series primary windings interconnecting the remaining source phase and a midpoint of the primary winding of the transformer of the first pair connected between the associated divided windings and including series opposed secondary windings interconnecting the remaining motor phase and a midpoint of the secondary winding of said last-named transformer, control windings for said second pair of transformers, the net voltage across each of said pairs of transformers being approximately zero when said control windings are de-energized, and control means responsive to control signals for energizing said first-named control winding and for selectively energizing one or the other of said last-named control windings to provide a substantial voltage at the secondary windings of both said first and second pairs of transformers to energize said motor.

6. In a control system responsive to control signals and for reversing the direction of rotation of a three-phase motor actuated by a three-phase source of power, a pair of transformers including series primary windings interconnecting two of the source phases and series opposed secondary windings interconnecting two of the motor phases, one of said transformers having a saturating winding to reduce the effectiveness of the transformer, a second pair of transformers including series primary windings interconnecting the remaining source phase and a midpoint of the primary winding of one of said first pair of transformers, and series opposed secondary windings interconnecting the remaining motor phase and a midpoint of the secondary winding of said last-named transformer, saturating windings for said second pair of transformers to reduce their effectiveness, and control means responsive to control signals for energizing said first-named saturating winding and for selectively energizing one or the other of said last-named saturating windings.

7. In combination a three-phase electric circuit having three conductors, a reversible motor having three terminals, energy transfer means interconnecting said motor terminals and said conductors and having balanced opposing energy transfer elements connected to two of said motor terminals and with the net voltage across said means approximately zero so that no current flows to said motor terminals from said conductors, means for unbalancing said energy transfer elements so that a substantial net voltage appears across said energy transfer means to cause current to flow to said two motor terminals, other means associated with said energy transfer means and with the remaining one of said motor terminals for determining the voltage phase impressed on said remaining motor terminal, and control means for energizing said first-mentioned unbalancing means and for energizing said other means.

8. In combination a three-phase electric circuit having a plurality of conductors, a reversible motor having a plurality of terminals, first energy transfer means interconnecting two of said motor terminals and two of said conductors and having balanced energy transfer elements with the net voltage across said energy transfer means approximately zero so that no current flows to said motor terminals from said conductors, a control for unbalancing said elements so that a substantial net voltage appears across said energy transfer means and current flows to said motor terminals, second energy transfer means interconnecting the remaining one of said motor terminals and the remaining one of said conductors and having balanced energy transfer elements with the net voltage across said second energy transfer means approximately zero, so that no current flows to said one motor terminal from the associated conductor, a pair of controls arranged so that upon actuation of one or the other of said controls, said second energy transfer means is unbalanced and a substantial voltage appears across said second energy transfer means causing current to flow in the remaining one of said motor terminals, the phase of the voltage being determined by the control of the pair energized, and means for energizing said first control and for selectively energizing one of said pair of controls.

9. In combination a three-phase electric circuit having three conductors, a reversible three-phase motor having three terminals, first energy transfer means interconnecting two of the motor terminals and two of the conductors and having balanced energy transfer elements with the net voltage across said energy transfer means approximately zero, so that no current flows to said two motor terminals from said conductors, a control for unbalancing said elements so that a substantial net voltage appears across said energy transfer means and current flows to said two motor terminals, second energy transfer means interconnecting the third motor terminal and the third conductor and having balanced energy transfer elements with the net voltage across said energy transfer means approximately zero so that no current flows to said third motor terminal from said third conductor, a pair of controls adapted to be energized one at a time to unbalance said last-mentioned energy transfer elements so that a substantial net voltage appears across said second energy transfer means causing current to flow in said third motor terminal, the phase of the voltage across said second energy transfer means being determined by the control energized, and means for energizing said first control and for selectively energizing one of said pair of controls.

10. In combination a three-phase electric circuit having three conductors, a reversible three-phase motor having three terminals, first energy transfer means directly interconnecting two of the motor terminals and two of the conductors, second energy transfer means directly interconnecting the third motor terminal and the third conductor and having balanced energy transfer elements with the net voltage across said second energy transfer means approximately zero so that no current flows to said third motor terminal from said third conductor, a pair of controls adapted to be energized one at a time for unbalancing said second energy transfer elements so that a substantial net voltage appears across said second energy transfer means, the phase of the voltage being determined by the control energized, and means for selectively energizing one or the other of said controls.

11. In combination a three-phase electric circuit having three conductors, a reversible three-phase motor having three terminals, a first pair of transformers including series primary windings interconnecting two of the conductors and series opposed secondary windings interconnecting two of the motor terminals, one of said transformers being provided with a saturating winding adapted to be energized to reduce the effectiveness of the transformer, a second pair of transformers including series primary windings interconnecting the third conductor and a midpoint of the primary winding of one of said first pair of transformers and series opposed secondary windings interconnecting the third motor terminal and a mid-point of the secondary winding of said last-mentioned transformer, a pair of saturating windings for said second pair of transformers adapted to be energized to reduce their effectiveness, and means for energizing said first transformer saturating winding and for selectively energizing one of said pair of said second transformer saturating windings.

ALAN M. MacCALLUM.
WILLIAM HARGREAVES.

REFERENCES CITED

The following references are of record in the file of this patent:

UNITED STATES PATENTS

| Number | Name | Date |
|---|---|---|
| 808,944 | Porter et al. | Jan. 2, 1906 |
| 1,713,223 | Green | May 14, 1929 |
| 1,797,268 | Lee | Mar. 24, 1931 |
| 1,816,717 | Belt | July 28, 1931 |
| 1,844,704 | Thompson | Feb. 9, 1932 |
| 1,858,425 | Wittkuhns | May 17, 1932 |
| 1,902,462 | Palmer | Mar. 21, 1933 |
| 1,959,804 | Wittkuhns et al. | May 22, 1934 |
| 2,228,078 | Gulliksen | Jan. 7, 1941 |
| 2,281,593 | Odessey | May 5, 1942 |